United States Patent
Nseir et al.

(10) Patent No.: US 8,806,335 B2
(45) Date of Patent: Aug. 12, 2014

(54) INTERACTIVE DIGITAL EXPERIENCE FOR A LITERARY WORK

(75) Inventors: Tarek Nseir, London (GB); James Deeley, London (GB); Adrian Pease, Newcastle upon Tyne (GB); Sam Nseir, Newcastle upon Tyne (GB)

(73) Assignee: Pottermore Limited, London (GB)

( * ) Notice: Subject to any disclaimer, the term of this patent is extended or adjusted under 35 U.S.C. 154(b) by 109 days.

(21) Appl. No.: 13/226,130

(22) Filed: Sep. 6, 2011

(65) Prior Publication Data

US 2013/0061140 A1    Mar. 7, 2013

(51) Int. Cl.
*G06F 3/00* (2006.01)

(52) U.S. Cl.
USPC .......................................................... 715/273

(58) Field of Classification Search
USPC ........................ 715/234, 243, 254, 255, 273
See application file for complete search history.

(56) References Cited

U.S. PATENT DOCUMENTS

| | | | |
|---|---|---|---|
| 2006/0047504 A1* | 3/2006 | Kodama | 704/200 |
| 2012/0036423 A1* | 2/2012 | Haynes et al. | 715/230 |
| 2012/0066581 A1* | 3/2012 | Spalink | 715/232 |
| 2012/0113019 A1* | 5/2012 | Anderson | 345/173 |
| 2012/0143590 A1* | 6/2012 | Ajima | 704/2 |
| 2012/0196577 A1* | 8/2012 | Kwong | 455/414.1 |
| 2012/0210203 A1* | 8/2012 | Kandekar et al. | 715/230 |
| 2012/0221968 A1* | 8/2012 | Patterson et al. | 715/776 |

* cited by examiner

*Primary Examiner* — Kyle Stork

(57) ABSTRACT

An interactive digital experience for a literary work is described. An embodiment describes a method which provides an interactive service, such as a website or mobile application, to a user. As the user interacts with the service which is related to a literary work, they navigate along a storyline within the service which corresponds to the storyline within the literary work and the user's position along that storyline is stored. Within the service, the user generates elements of user generated content and each element of user generated content which is created is stored with a position reference specifying a position of the user when that element was created. User generated content which was generated by one or more other users of the service is displayed to the user; however content which was generated by any user at a position beyond the user's stored position along the storyline is not displayed.

20 Claims, 5 Drawing Sheets

INTERACTIVE DIGITAL EXPERIENCE FOR A LITERARY WORK

BACKGROUND

Many literary works are now made available in digital form (as e-books) so that they can be read on a dedicated e-book reader or on a computer, tablet PC or smartphone which runs appropriate software. Some of these platforms offer additional features, such as enabling a user to annotate an e-book and then share the comments with others. In addition, some books are being published as enhanced e-books which, compared to standard e-books, include additional embedded material in the form of audio or video material or single page Portable Document Format (PDF) files showing detailed maps or diagrams.

The embodiments described below are not limited to implementations which solve any or all of the disadvantages of known digital editions of literary works.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

An interactive digital experience for a literary work is described. An embodiment describes a method which provides an interactive service, such as a website or mobile application, to a user. As the user interacts with the service which is related to a literary work, they navigate along a storyline within the service which corresponds to the storyline within the literary work and the user's position along that storyline is stored. Within the service, the user generates elements of user generated content and each element of user generated content which is created is stored with a position reference specifying a position of the user when that element was created. User generated content which was generated by one or more other users of the service is displayed to the user; however content which was generated by any user at a position beyond the user's stored position along the storyline is not displayed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Figure 1:
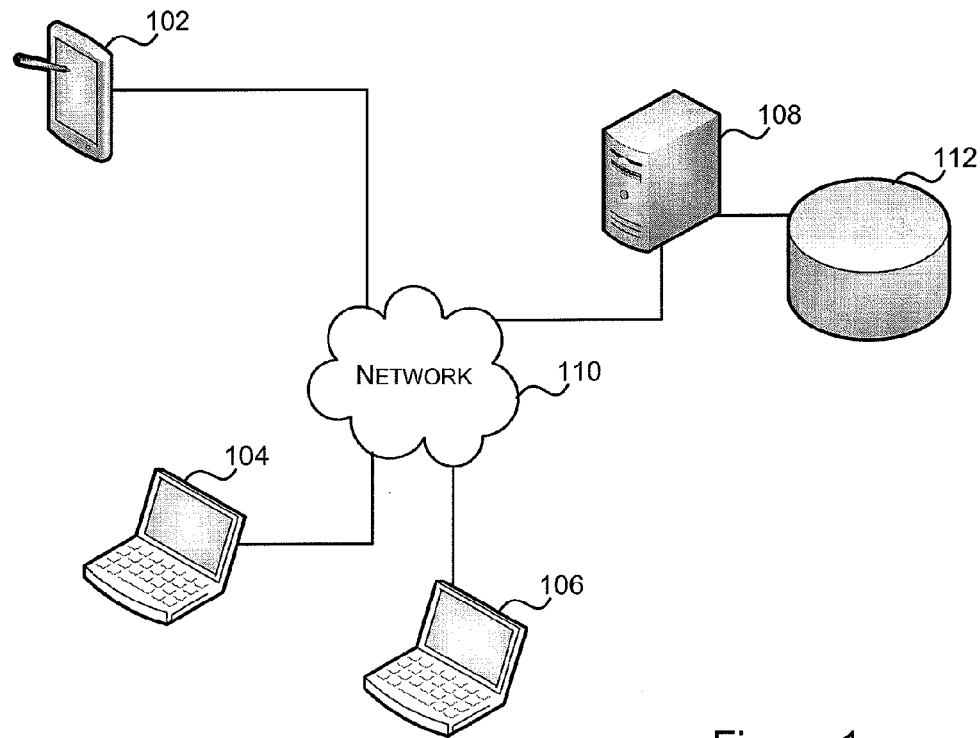
FIG. 1 is a schematic diagram showing a number of user computing devices connected to a server via a network.

Common reference numerals are used throughout the figures to indicate similar features.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

FIG. 1 is a schematic diagram showing a number of user computing devices 102-106 and a server 108. The server 108 is arranged to provide an interactive digital experience (or interactive digital service) which is related to a literary work and which users can access from their user computing devices 102-106 via a network 110, such as the Internet (or via multiple networks, such as a home network and the Internet). The server 108 is connected to a data store 112 which stores some or all of the content used in providing the interactive digital experience for users.

The user computing devices 102-106 may be any form of computing device which can access and browse the Internet, including, but not limited to, desktop, laptop and tablet computers, smartphones and e-book readers. In the schematic diagram of FIG. 1, device 102 is a tablet computer and devices 104 and 106 are laptop computers, but this is by way of example only. The server 108 is shown in FIG. 1 as a single device; however it will be appreciated that the service may be provided by one or more servers where each server may provide a subset of the service functionality (so that a combination of servers provide the interactive service) and/or there may be multiple servers which each provide the entire service in order to provide sufficient capacity, responsiveness, geographical coverage etc. Any reference to server 108 in the following description therefore refers to a single server or to a collection of servers which may be geographically co-located (e.g. in a server farm) or geographically distributed.

The term 'literary work' is used herein to refer to any written material which may be fiction or non-fiction including, but not limited to, novels, stories, screen plays, etc. The literary work may be a single book or may be a series of books (e.g. the three books within a trilogy or a series of more than three books).

Aspects of the operation of the interactive service and the server 108 that provide the service can be described with reference to FIGS. 2 and 3. The interactive digital experience (or interactive digital service) which is provided and which is related to a literary work may, for example, be an interactive website or mobile application. Any reference to a website in the following description is by way of example only, it will be appreciated that, for purposes of explanation only, only some aspects of the service (e.g. website or mobile application) and the server operation are shown in these figures and described below.

Figure 2:
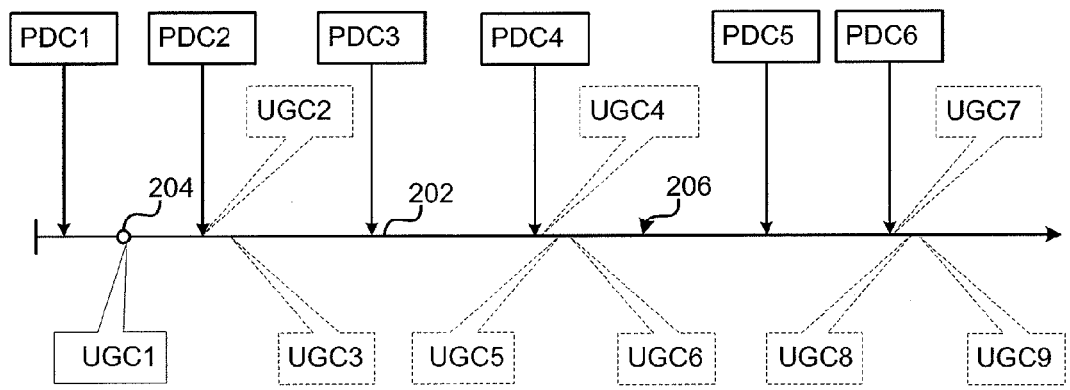
FIG. 2 shows a schematic diagram of a storyline within an interactive service (such as a website or mobile application) which is related to a literary work.

FIG. 2 shows a schematic diagram of a storyline 202 within the service, where the storyline is true to the storyline within the related literary work, i.e. the storyline of the service follows the literary work such that the same significant (or important) scenes occur in the same order as in the related literary work. The significant scenes may, for example, be identified manually by the author or by another person and in some examples users of the interactive service may be able to provide feedback on which scenes within the literary work they consider significant. FIG. 3 shows a flow diagram of an example method of operation of the server 108.

The server 108 provides an interactive service (e.g. website) which can be accessed by a user (block 302). As described above, this interactive service is related to a literary work (which may be a fictional work) and provides a storyline 202, which is true to the storyline of the related work, and which is navigated by the user as they interact with the service and progress through it. A user may progress along the storyline by completing tasks, reading sections of text (which may be exact replicas of sections of text from the literary work), completing other interactive exercises or experiences or through other activities within the interactive service. The server 108 maintains a record of the user's current position 204 along the storyline 202 (block 304) and in an example, the user's position may be recorded in a user profile data structure which is stored by the server (e.g. in data store 112), e.g. in the form of a centrally held bookmark within the user profile data structure. In some examples of an interactive service, the storyline 202 itself and a user's position along that storyline (e.g. position 204) may be displayed graphically as part of the graphical user interface (GUI) of the service. In other examples, the storyline 202 may not be displayed to a user. Where the storyline is displayed within the GUI, the positions of one or more other users of the service along the storyline (e.g. the position of friends of the user) may also be displayed along the storyline.

As the user progresses along the storyline 202 (in the direction indicated by the arrowhead in FIG. 2), different predetermined content (PDC) is revealed at different stages along the storyline and this may be referred to as the progressive unlocking of data or progressive unlocking (or revealing) of the service (e.g. website) itself. In the schematic diagram of FIG. 2, six items of predetermined content PDC1-6 are shown being revealed at six different points along the storyline 202. This is by way of example only and it will be appreciated that a service may have many more elements of predetermined content which are revealed to a user at predefined points as they progress along the storyline 202. Once an element of predetermined content has been revealed, a user may access this content even if they have progressed beyond the point at which it has been revealed and through this mechanism the service and user experience grows as the user navigates along the storyline. Furthermore, in some examples, a user may still be able to access this content even if they decide to step backwards to an earlier point in the storyline and this is described in more detail with reference to FIG. 6.

As the user interacts with the service, the user may upload some user generated content (UGC) which enables social interaction between users of the service (e.g. a user can socialize their thoughts) and enhances each user's experience within the service through sharing of experiences between users. This UGC may be user generated comments (e.g. a user's thoughts, feedback etc on the story, social chat or any other form of social interaction), images (e.g. photographs, drawings, etc, which may be generated by the user within the service or generated externally to the service), records of user activities (e.g. earning points, discovering system content etc) or any other form of user generated content. Where the UGC comprises a user's comments these may be in the form of text entries, sound files of recorded user speech or images and any element of UGC may be in the form of text, sound file, image or any other audiovisual format. In some examples, the UGC may be uploaded at any point along the storyline and in other examples, the service (e.g. the website) may define specific positions where UGC can be uploaded and in such examples, a user may be prompted to provide input in the form of UGC at these positions. In the schematic diagram of FIG. 2, one item of UGC is shown which has been generated by the user at position 204, element UGC1. FIG. 2 also shows elements of UGC which have been generated by other users (as indicated by the dotted outlines of the boxes) at later points along the storyline, elements UGC2-9. In an example, elements UGC4-6 may have been generated by three different users in response to the predefined content PDC4 being displayed to each user within the service.

When the user generates some. UGC this is received by (e.g. uploaded to) the server 108 (block 306) and the element of UGC received (e.g. UGC1) is stored in, a data store along with a reference to the position of the user along the storyline at the time they generated the element of UGC (block 308). In an example, this position is the position of the user as stored in the user profile (which is maintained in block 304) at the time the UGC is received (in block 306). In an alternative example, an updated user position is provided to the server along with the UGC (in block 306) and these two pieces of data (the UGC and the position reference) are stored together at the server. In the example shown in FIG. 2, the element of UGC, UGC1, will be stored by the server (in block 308) along with a reference to position 204 along the storyline 202. Each of the other elements of UGC, UGC2-9, will have been previously stored by the server when they were received from the particular user generating the content along with a position of the generating user at the time the content was generated.

Content which is generated by one or more other users (e.g. UGC2-9 in the example of FIG. 2) is displayed to the user based at least on the user's stored (e.g. current) position and the position reference which is stored with each element of UGC, i.e. the position along the storyline at which the element of UGC was generated, (block 310). In particular, only UGC which has been generated at a position which is not ahead of the stored user position will be displayed to the user (i.e. only third party UGC which was generated at a position which is either the same as the stored user position or is before the stored user position will be displayed). In the example shown in FIG. 2, where the user is at position 204, the server will not display any of the UGC elements UGC2-9 to the user (in block 310) as all these elements have been generated by users at positions beyond position 204 along the storyline 202. When the user has progressed to a position shown by arrow 206, however, the server will display UGC2-6 to the user but not UGC7-9.

There may be other factors which also determine which UGC is displayed to a user (in addition to position along the storyline), for example, a user may only see UGC generated by a subset of the other users of the service. This subset of other users (which may contain no users, one user, multiple users, etc) may, for example, comprise 'friends' of the user (where these friends may be defined within the service or with reference to another website or service, such as a social networking website, email account or contacts list) or may comprise friends of friends (e.g. such that the subset comprises all a user's friends and all the friends of each friend of the user) or any other relationships between users may be used. Alternatively (or in addition), the subset of users may be defined in any other way, for example, based on language, age, geography or attributes of the user profile. These factors may be considered to be either system driven (e.g. age, language, user profile attribute) or user driven (e.g. friends). The use of language as a factor may assist in delivering relevant content to a user (e.g. content in a different language which a user may not understand is not displayed) and use of age as a factor may assist in delivering appropriate content to a user (e.g. such that adults do not see drawings uploaded by children and children do not see content generated by adults).

If, for example, UGC from only a subset of users is displayed to the user (in block 310) where the subset comprises 'friends' and where UGC elements UGC2, UGC4 and UGC7 have been generated by friends of the user and the remaining UGC elements have not, only elements UGC2 and UGC4 will be displayed to the user when they reach the position shown by arrow 206 and elements UGC3, UGC5-9 will not be displayed as they do not satisfy the display criteria (UGC3, UGC5 and UGC6 were not generated by friends and UGC7-9 were generated at positions beyond the user's current position). In another example, where language is used as a factor, French speaking users may only see comments from friends (who may speak any language) and other French speaking users. If age is used as a factor to select the subset of users whose UGC can be viewed by another user, users under 18 years old may only see UGC generated by other users who are under 18 years, or there may be age ranges defined (e.g. under 10 years, 10-15 years, 15-17 years and over 18 years) and users may only see content generated by users in their age range. In a further example, the service may at some stage divide the users into groups (e.g. houses within a boarding school sating) and then these groups may be used in defining the subset of users whose UGC is visible to a particular user (subject to the position constraints, described above), e.g. users from the same house.

There may be other factors which are used in addition to position (and in addition to or instead of defining a subset of users whose comments are displayed), such as a timestamp which may be associated with each element of UGC. In such an example, UGC may have an expiry data after which time it is not displayed to other users, even where those users meet any criteria based on relationships between users (e.g. only UGC which has been generated in the last week may be displayed).

Using the methods described above, social comments which are generated by a user when interacting with the service (e.g. website) are not necessarily made available to others (e.g. their friends) in real time. These social comments or user chat (and other UGC) will only be made available to other users in real time where those other users are further along the storyline than the user generating the particular element of UGC. For users who are behind the generating user (in terms of position on the storyline), the UGC element will be held back (i.e. stored and not displayed) until a user has reached the point on the storyline at which the UGC was made. In this way, UGC, is progressively unlocked in a similar way to the predetermined content (as described above). This increases user enjoyment of the interactive digital experience by assisting in plot building and preventing other users (through their UGC) from prematurely revealing plot developments (which may be referred to as 'spoilers'). For example, a user generated comment or image which mentions a twist in the plot or other significant event (e.g. the death of a character), will not be displayed to a user who has not already reached that particular point in the plot and so a user will not find out how the story unfolds ahead of reaching that point in the storyline.

It will be appreciated that in some examples, the UGC may be moderated either before it is stored or before it is displayed to check that an element of UGC is relevant (e.g. relevant to the literary work) and/or not offensive. This moderation may be performed manually or automatically.

Figure 4:
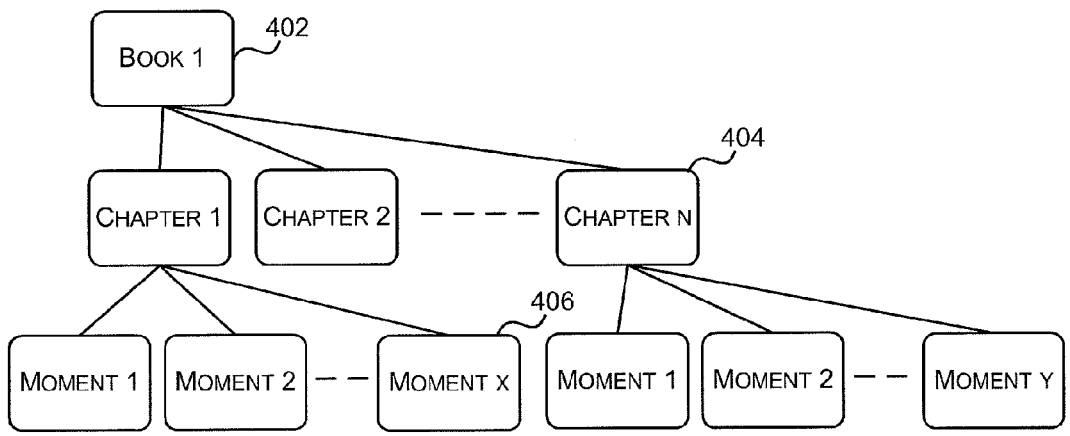
FIG. 4 is a graphical representation of a story-based taxonomy which may be used to define the storyline.

The storyline 202 may be defined in terms of a story-based taxonomy which is specific to the particular related literary work. The story-based taxonomy divides the literary work into a relational structure of elements within the literary work which can then be used in specifying the position of a user. In an example, the taxonomy may be defined in terms of a hierarchical structure of chapters and moments (or sub-chapters), or books 402, chapters 404 and moments 406, where the literary work spans more than one book, as shown graphically in FIG. 4. In other examples, a non-hierarchical, relational structure may alternatively be used. Although the taxonomy is based on the literary work, some of the content which is included within the taxonomy (e.g. within a moment) may expand on the literary work (e.g. some content may provide supplementary information which was not in the literary work itself) and hence expand the user's experience.

The division of the storyline into chapters (and books, where the work spans more than one book) is the same as in the literary work (i.e. the two correspond exactly) and the term 'moment' is used herein to refer to a significant (or key) scene within a chapter (the term 'scene', 'sub-chapter' or any other terminology may alternatively be used within the story-based taxonomy). Using the example story-based taxonomy shown in FIG. 4, the storyline may be written linearly as:

B-C-C-MMM . . . M-C-MMM . . . M- . . . B . . . C-MMM . . . M with B representing a book, C representing a chapter and M representing a moment. A user's position along such a storyline may, for example, be recorded as 'Book 1, Chapter 6, Moment 5'. A user remains in 'moment 5' within chapter 6 until they reach the next moment (moment 6) within the chapter, or if there is no moment 6 in chapter 6, until they reach the next chapter (chapter 7). It will be appreciated that the length of moments may differ according to the spacing of the significant scenes within the literary work. Similarly the number of moments per chapter will be different for different chapters. As described above, the significant scenes may be identified by the author of the literary work, or by another person. In some examples, the taxonomy may be 'social' in that users may be able to assist in defining which scenes are considered significant within a literary work.

In some examples, the storyline may be further divided into smaller elements such as paragraphs, sentences and/or words to provider a finer level of granularity in recording a user's position along that storyline. In most examples, pages are not used as a level of granularity within the storyline because different editions of a literary work (e.g. editions in different languages or reprints in the same language) may have page breaks in different places, different platforms may have different page sizes (e.g. a tablet computer may have a larger display, and hence page size, than a smartphone) and the number of words on a page (and hence the division of the work into pages) may also be affected by the text size which is selected by a user. It will be appreciated that while a taxonomy comprising books, chapters and moments is used herein by way of example, in other examples the relational structure of the story-based taxonomy may be defined differently, e.g. in terms of chapters and paragraphs.

As described above, UGC is stored along with a reference (for each element of UGC) which identifies the position of the user (on the storyline) who generated the content at the time they generated the content. This position reference refers to the story-based taxonomy for the particular literary work. Other content, which is not user generated, may also be stored referenced to the taxonomy, e.g. any system generated content (SGC) which is generated as a user interacts with the service and is not predetermined, or any other non-predetermined content. The SGC may, for example, comprise system generated messages which are triggered at a point in the storyline and which may be tailored to the specific user (and are therefore not predetermined content). Another example of SGC is an activity list and activity lists are described in more detail below. The predetermined content (e.g. PDC1-6 in FIG. 2) may also be stored in this way (i.e. referenced against the story-based taxonomy and stored in a separate data store to the taxonomy) or alternatively the predetermined content may be contained within the story-based taxonomy, as described in more detail below.

In an example, the story-based taxonomy may comprise all the predetermined content associated with the interactive service and everything which is not predetermined may be referenced to the story-based taxonomy (i.e. referenced to a position within the story-based taxonomy) and stored in one or more separate data stores or in one or more separate data structures (which may be held within the same data store as the taxonomy). In such an example, where all the predetermined content is contained within the taxonomy, the story-based taxonomy controls what content is displayed to a user and the state and version of that content (where multiple versions exist). For example, where there are many images of a character in the story (which are predetermined content), these may be stored as different versions and which version of an image is displayed at any particular point along the storyline may be contained within the taxonomy. For example, 'Character X version 1' may be displayed in book 1, chapter 1, moment 5 and version 8 of the same character may be displayed in book 1, chapter 5, moment 2.

Within the story-based taxonomy, a moment may comprise one or more tags, such as character tags (e.g. 'Character X v1' which defines the version of a character which relates to the moment) and object tags. The object tags may relate to objects which may be collected by the user at that point in the storyline (and hence may be referred as 'collectables') or objects which may be discovered, but not collected, by the user at that point in the storyline (and hence may be referred to as 'discoverables') or the objects may be classified in other ways.

In addition to tags, a moment may comprise relationships between entities (which may be objects, characters, skills, powers etc). For example, a relationship within a moment may record that a character is a friend of another character, or that a character works for another character. These relationships may change along the storyline and through the use of these relationships within the story-based taxonomy, the changing nature of interaction between entities may be captured and enabled to evolve as the user progresses along the storyline. These evolving relationships can be used to provide a richer user experience which corresponds more closely to the literary work itself and which grows as the user progresses along the storyline.

Within the story-based taxonomy, a moment may comprise activity information for characters within the literary work for use in generating activity lists. These activity lists are an example of system generated content because they comprise information which is tailored to the user (and hence is not entirely predetermined). An activity list includes the current activity of one or more characters within the literary work (at the position where the user is along the storyline) and the current activity of one or more other users (where these users may be a subset of all the users and the subset may be defined using any combination of the factors described above). In a variation on an activity list, the system generated content may include location lists which identify the current location of one or more characters within the literary work (based on location information stored within the taxonomy) and the current location of one or more other users of the service.

In an example, the interactive service (e.g. interactive website) may provide a "clever encyclopedia" for the user which relates to the literary work and which the user can interrogate at any point along the storyline, for example to confirm which characters knows another character within the work etc. By storing the predetermined content within (or referenced to) the taxonomy, only the content which is available to a user at their current point along the storyline is included within the clever encyclopedia and can be revealed in response to a user query. As the user progresses along the storyline, more content becomes available to the user and the content is progressively unlocked. In another example, a character may learn a new skill (e.g. they may learn to perform a particular spell) at a particular point within the storyline and this may be recorded as a new relationship (character to skill) within the story-based taxonomy for the relevant moment when the learning event occurs. This may enable a user to look up which characters can use which skills (e.g. spells) at the particular point in the storyline that they have reached. It will be appreciated that there may also be some content which is outside of the storyline and which is accessible to users at any position along the storyline.

Moments within the story-based taxonomy may also comprise one or more triggers. These triggers dictate how, what and when content is revealed to a user within the interactive service and these triggers may refer to the tags (e.g. object tags) described above. A trigger may specify a condition (e.g. a user must have collected objects x, y and z) and an outcome (e.g. additional content which is revealed) which occurs if the condition is met. The conditions may, for example, be defined in terms of aspects contained within the taxonomy and/or attributes within a user or community profile. The community profile refers to a profile associated with a group of users within the interactive service (e.g. a community profile for a house in a boarding school environment). The group of users may be defined by the service (e.g. where the service allocates each user to a group) or by users (e.g. with a group of friends forming a group on the service). As each trigger is contained within the taxonomy, it does not necessarily need to include a position condition as this position condition (i.e. a user must have reached position X along the storyline) is inherent in where the trigger has been placed within the taxonomy; however, where a user can move backwards along the storyline, a trigger may define different outcomes for subsequent visits to the same position (or there may be no outcome for subsequent visits, such that the outcome only occurs on the first visit to the particular trigger position). Where more than one position is stored for a user (as described in more detail below), triggers may include conditions relating to any one or more of these stored positions. There may be various types of outcomes within triggers and in an example the outcomes may involve unlocking content or rewarding the user or a group (or community) which the user is part of (e.g. where the users are grouped into houses or teams they may be awarded points). Conditions need not always be positive in nature and in some examples, the user (or the group to which the user belongs) may be penalized by having points or objects they have collected taken away. It can be seen from the above description that a trigger may involve a user or community profile as part of the conditions which must be satisfied and where the condition is satisfied, the outcome may result in a user or community profile being updated.

Although the description above refers to tags, relationships and triggers, as well as other predetermined content being included within moments, it will be appreciated that these elements can in addition, or instead, be included at different levels within the story-based taxonomy (e.g. at the book or chapter level, or at a more granular sentence level). In some example implementations, this detail may only be included at the lowest level of the taxonomy; however in other examples the tags, relationships, triggers, and/or content may be included at any level within the taxonomy.

Figure 5:
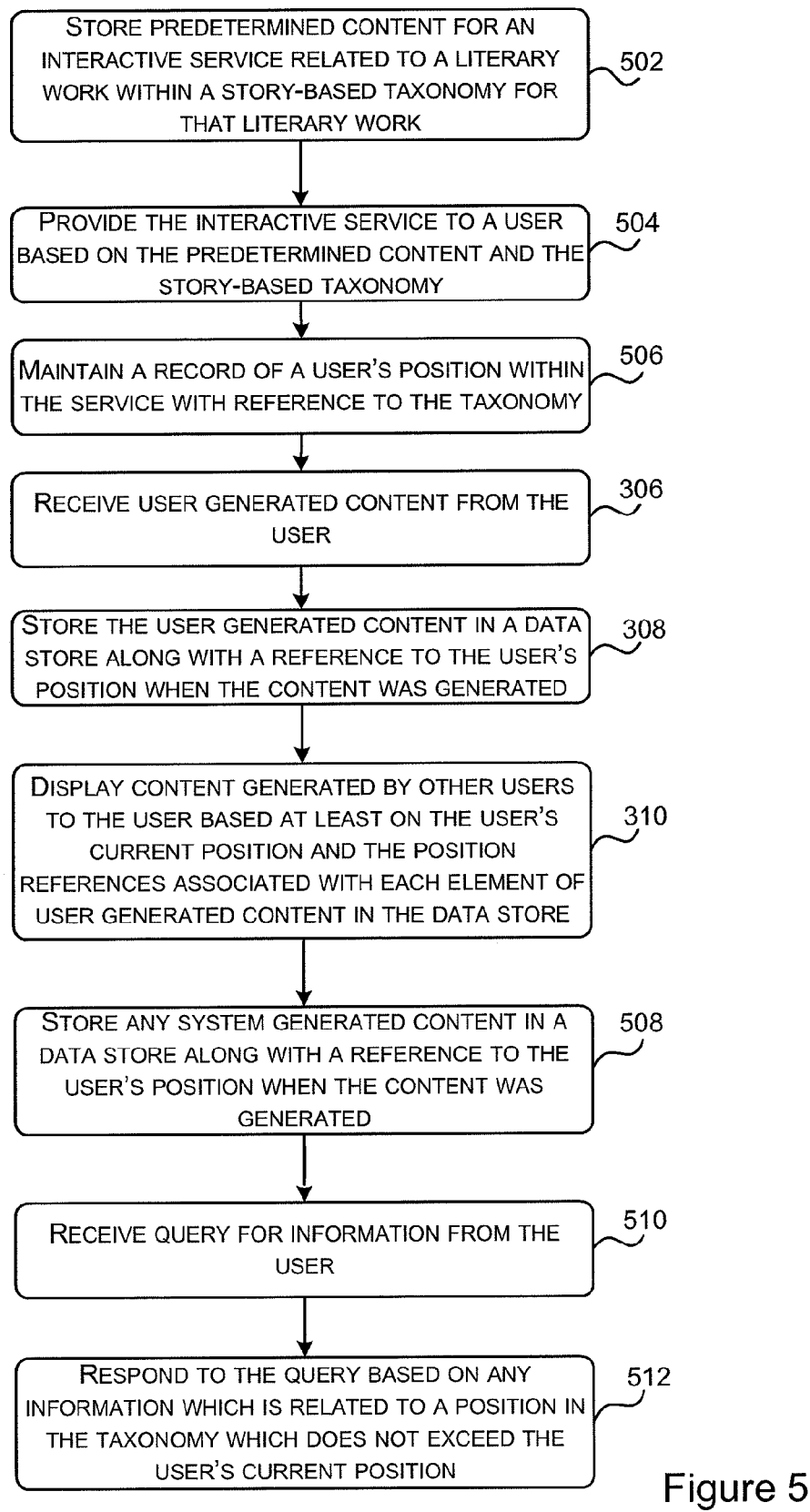
FIGS. 5 and 6 show flow diagrams of further example methods of operation of a server.

FIG. 5 shows a flow diagram of another example method of operation of the server 108. In this example, the server 108 stores any predetermined content for an interactive service related to a literary work within a story-based taxonomy for that literary work (block 502). The predetermined content comprises content which is the same for all users and which is generated prior to the user interacting with the service. The server can then provide the interactive service to a user based on this stored predetermined content and the story-based taxonomy which is specific to the literary work (block 504). As described above, this interactive service provides a storyline which is defined by the story-based taxonomy and is true to the storyline of the related work. The storyline is navigated by the user as they interact with the service and progress through it. A user may progress along the storyline by completing tasks, reading sections of text (which may be stored within the taxonomy), completing interactive experiences etc and as they progress the content which is displayed to them (and/or which is available to be displayed to them) is grows as it is progressively unlocked based on the user's position and in some examples based on other factors (e.g. as defined by triggers within the taxonomy). The provision of the service (in block 504) includes the display of content, interactive experiences, etc, to the user as defined within the story-based taxonomy for the particular position that the user has reached. A record of the user's current position within the service with reference to the taxonomy is maintained (i.e. stored and regularly updated) by the server (block 506), e.g. within a user profile stored at the server.

As described above, the server receives user generated content from the user as the user interacts with the service (block 306). This UGC is stored in a data store along with a reference to the user's position when the content was generated (block 308) and as described above, this position is defined with reference to the story-based taxonomy for the particular literary work. The server displays content generated by one or more other users to the user based at least on the user's current position and the position references associated with each element of user generated content in the data store (block 310) and as described above, this display of UGC may also be based on other factors. In an example, the one or more other users whose UGC is displayed comprises a subset of the users of the service where the subset of users may be defined based on a relationship between users (e.g. friends, friends of friends, etc) or in any other way (e.g. a fixed number of users selected at random or a fixed number of users selected based on their position along the storyline, such as the closest ten users to the user).

Any content which is generated by the server (i.e. system generated content) as the user interacts with the service, which by its nature is not predetermined content and is therefore not already stored within the story-based taxonomy, is stored by the server in a data store along with a reference to the user's position when the content was generated (block 508) in a manner which is analogous to the storing of UGC.

As described above, the predetermined content, system generated content, user generated content and any other information which is stored within the story-based taxonomy may collectively comprise an encyclopedia about the literary work that can be interrogated by a user. The encyclopedia is termed a 'clever encyclopedia' as the data displayed in response to any query (i.e. the data available within the encyclopedia) is related to a user's current position within the story-based taxonomy and so the content of the encyclopedia grows as the user progresses along the storyline. As shown in FIG. 5, if the server receives a query for information from a user (block 510) at any point in their journey along the storyline, the server responds to the query based on any information which is related to a position in the taxonomy which does not exceed (i.e. is not beyond) the user's current position (block 512).

Figure 6:
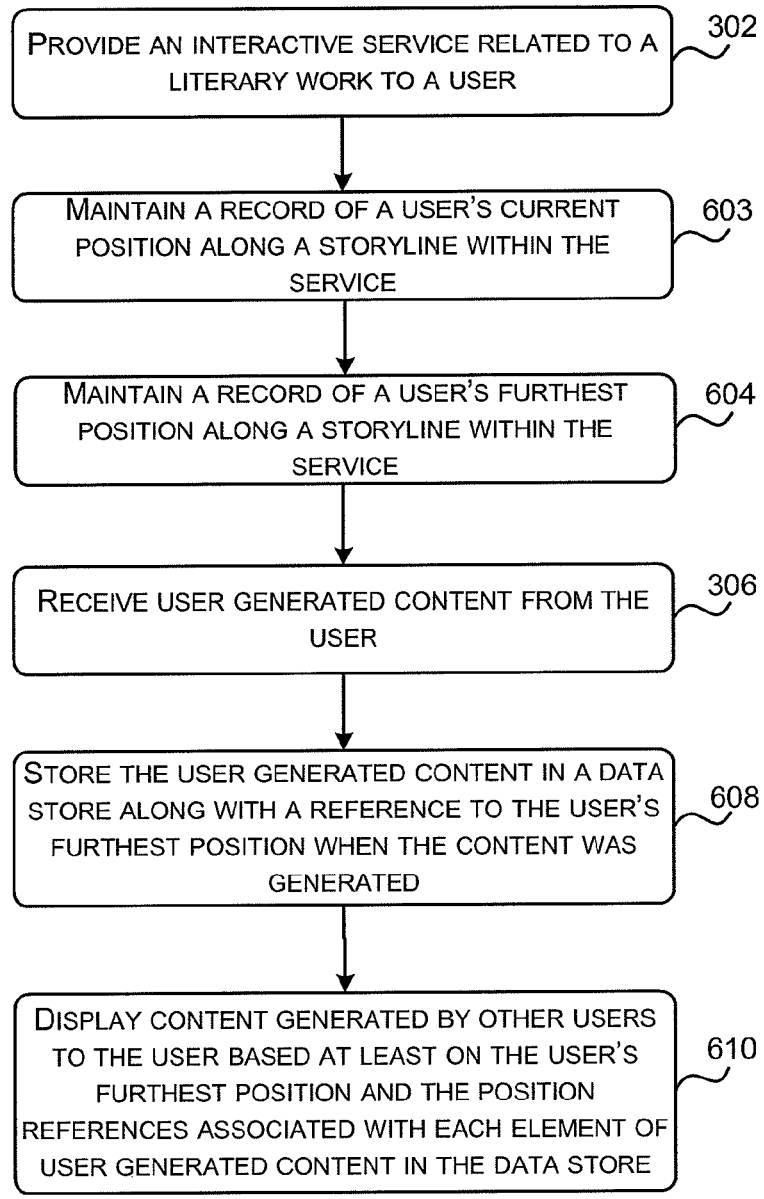

The above description describes the use of a user's current position in determining what content is displayed to the user. In some examples, however, more than one position may be stored and updated for each user and any one or more of these positions may be referred to as a user's 'recorded position', FIG. 6 shows a flow diagram of another example method of operation of the server 108 in which both a users current position and their furthest position along the storyline are stored and used in provision of the service. The furthest position may be defined based on the furthest point that the user has reached along the storyline within the service (e.g. where a user is able to go backwards as well as forwards along the storyline a user's current position may be behind their furthest position) and/or on information provided to the service by the user (e.g. on registration) which identifies how much of the literary work the user has read outside of the interactive service (e.g. in a paper version of the literary work or in a conventional e-book).

Figure 3:
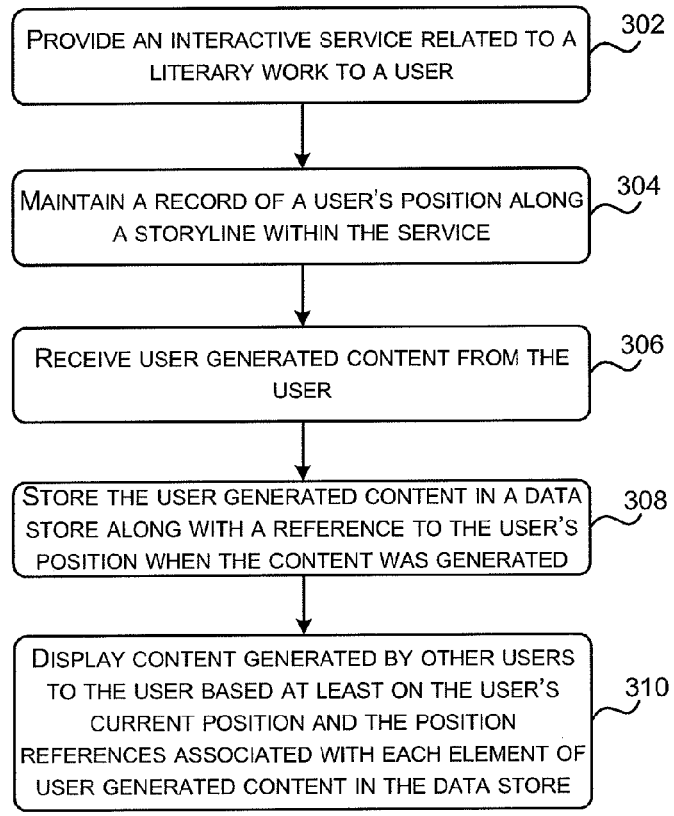
FIG. 3 shows a flow diagram of an example method of operation of a server.

The flow diagram shown in FIG. 6 is a variation of that shown in FIG. 3 and described above. In addition to maintaining a record of a user's current position along a storyline within the service (block 603), the server 108 also maintains a record of the user's furthest position along the storyline (block 604). Instead of storing elements of UGC along with a reference to the users current position when the UGC was generated, this UGC is instead stored with a reference to the users furthest position (block 608). The further assists in avoiding spoilers because if a user has, for example, read to the end of a book, any comments they subsequently make at an earlier stage along the storyline within the service may be influenced by things they have already read but which occur at later points along storyline. Additionally, in the example shown in FIG. 6 the UGC is displayed (in block 610) based on a user's furthest position rather than a user's current position (although in a further example, the content may instead be displayed based on a user's current position, as in block 310 of FIG. 3).

In a variation of the method shown in FIG. 6, the system may receive a query for information from the user (as in block 510 of FIG. 5, described above) and in such an instance, the response to the query may be based on information which is related to a position in the taxonomy which does not exceed the user's furthest position along the storyline (in contrast to the users current position which is used in block 512 of FIG. 5).

In other examples, there may be additional user positions which are stored in addition to the current position and in some examples in addition to the furthest position. One example of such an additional user position is a user's furthest authorized position. This position may be a platform (or system) controlled parameter to enable additional content or parts of the storyline to be released to users at a particular time. For example, where the storyline involves multiple books, the service may initially only be released for the first book and so the furthest authorized position may be set (for all users of the service) to the end of the first book, thereby preventing any users from progressing further along the storyline. When the next book is released, this furthest authorized position parameter may be updated. In other examples, this furthest authorized position parameter may be used to unlock extra content for all users on a particular day.

Figure 7:
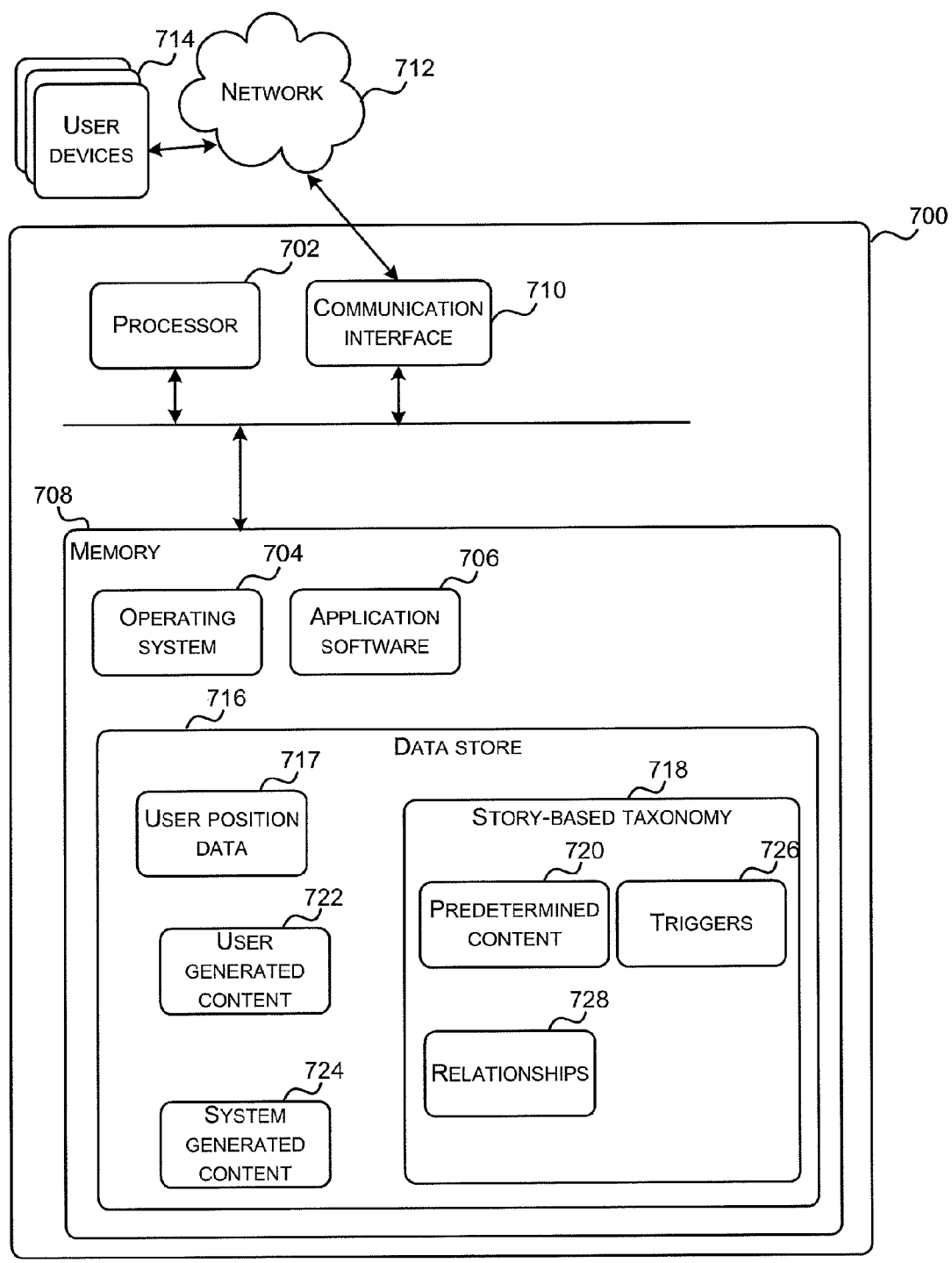
FIG. 7 illustrates an exemplary computing-based device in which embodiments of the methods described herein may be implemented.

FIG. 7 illustrates various components of an exemplary computing-based device 700 which may be implemented as any form of a computing and/or electronic device, and in which may operate as a server to provide an interactive web experience as described above.

Computing-based device 700 comprises one or more processors 702 which may be microprocessors, controllers or any other suitable type of processors for processing computer executable instructions to control the operation of the device in order to provide an interactive web-based experience, as described above. In some examples, for example where a system on a chip architecture is used, the processors 702 may include one or more fixed function blocks (also referred to as accelerators) which implement a part of the method of providing the interactive service (e.g. interactive website) in hardware (rather than software or firmware). Platform software comprising an operating system 704 or any other suitable platform software may be provided at the computing-based device to enable application software 706, such as software which provides the service and any interactive elements within the service, to be executed on the device.

The computer executable instructions may be provided using any computer-readable media that is accessible by computing based device 700. Computer-readable media may include, for example, computer storage media such as memory 708 and communications media. Computer storage media, such as memory 708, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 708) is shown within the computing-based device 700 it will be appreciated that the storage may be distributed or located remotely and accessed via a network or other communication link (e.g. using communication interface 710). The communication interface 710 links the computing-based device 700 to a network 712 in order that user devices 714 can connect to the computing-based device 700 and users can interact with the service, using software (e.g. browsers) installed on their user computing devices 714.

The memory 708 also comprises one or more data stores 716 for storing user position data 717 (e.g. in the form of user profiles containing the user position data), the story-based taxonomy 718 (which may include the predetermined content 720), user generated content 722 and system generated content (SGC) 724. As described above, each element of the user generated content 722 and system generated content 724 is referenced to the story-based taxonomy (e.g. each element has an associated position reference which defines a position in the taxonomy, such as 'Chapter 2, Moment 1'). The story-based taxonomy also comprises the triggers 726 and relationships between entities 728 although these may be considered as part of the predetermined content 720. The UGC 722 and SGC 724 may be stored within the same data structure or within separate data structures.

The computing-based device 700 may also comprise an input/output controller (not shown in FIG. 7) arranged to output display information (such as a GUI) to a display device which may be separate from or integral to the computing-based device. Such an input/output controller may also be arranged to receive and process input from one or more devices, such as a user input device (e.g. a mouse or a keyboard) and to output data to devices other than the display device (e.g. a locally connected printing device).

In the methods described above, everything which persists about what a user does within the interactive service is linked to the story-based taxonomy which is specific to the particular literary work and most content which is displayed within the service is either contained within the taxonomy or referenced to a position within the taxonomy. There may be some areas of the service (and hence content) which are outside the storyline, although these areas may initially be unlocked for a user based on the story-based taxonomy. The story-based taxonomy is described as being specific to the particular literary work in that the division into chapters, moments etc will be different for different literary works. In some examples, the taxonomy may also be different for different editions (e.g. different language editions) of the same literary work.

The methods described above allow the server to create an interactive digital experience which is built around a literary work and the storyline within the literary work. The experience grows and the user engagement deepens as a user progresses along the storyline and everything a user can do within the interactive service is relevant to the storyline as it has unfolded up to the current position of the user and does not contain spoilers.

Although the present examples are described and illustrated herein as being implemented in a system as shown in FIG. 1, the system described is provided as an example and not a limitation. As those skilled in the art will appreciate, the present examples are suitable for application in a variety of different types of systems and there may be one or more servers and one or more networks which are used in the provision of the interactive web experience to a user. As described above, the digital service may be a website, mobile application or any other form of digital service. Furthermore, although in many examples, the digital service may be an online service, in some examples, the user may run the service for at least a part of the time without a network connection and then periodically synchronize data (e.g. position data, UGC, etc) with the server.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
providing an interactive service to a user, the interactive service being related to a literary work;
maintaining, at a server, a recorded position of the user along a storyline within the interactive service, the storyline within the interactive service corresponding to a storyline within the literary work;
receiving, at the server, user generated content from the user;
storing the user generated content received in a data store, each element of user generated content being stored with an associated position reference corresponding to the user's recorded position when the element of the user generated content was generated;
displaying, to the user, user generated content generated by one or more other users at positions along the storyline within the interactive service that do not exceed the user's recorded position and not user generated content generated by one or more other users at positions along the storyline within the interactive service that exceed the user's recorded position, the user generated content displayed to the user including user generated content generated by another user at a position different from the user's recorded position.

2. A method according to claim 1, wherein the user's recorded position is different from the user's current position along the storyline within the literary work.

3. A method according to claim 1, wherein the recorded position of the user is the user's furthest position along the storyline within the interactive service, the displaying includes displaying, to the user, user generated content generated by one or more other users having furthest positions along the storyline within the interactive service that do not exceed the user's recorded position and not user generated content generated by one or more other users having furthest positions along the storyline within the interactive service that exceed the user's recorded position.

4. A method according to claim 1, wherein the user's recorded position is defined with respect to a story-based taxonomy which is specific to the literary work and which divides the literary work into a relational structure of elements within the literary work.

5. A method according to claim 4, wherein the story-based taxonomy comprises chapters and moments, each moment corresponding to a significant scene within a chapter.

6. A method according to claim 4, wherein the story-based taxonomy comprises predefined content associated with the interactive service.

7. A method according to claim 6, wherein the story-based taxonomy comprises object tags, character tags and triggers, the object tags, character tags and triggers describing conditions under which elements of the predetermined content are revealed to a user within the interactive service.

8. A method according to claim 1, wherein providing the interactive service to the user comprises: displaying a graphical representation of the storyline within the interactive service to the user and a graphical representation of the user's recorded position along the storyline within the interactive service.

9. A method according to claim 8, wherein providing the interactive service to the user further comprises: displaying a graphical representation of recorded positions of one or more other users along the storyline within the interactive service.

10. A method according to claim 1, wherein the user is a first user, the method further comprising:
   receiving a query from a second user; and
   sending, in response to the query, user generated content stored with a position reference which does not exceed the second user's recorded position.

11. A method according to claim 10, wherein the position reference stored with the user generated content sent in response to the query represents a position different from a current position of the second user when the second user sent the query.

12. A method according to claim 1, wherein the interactive service comprises one of an interactive website and a mobile application.

13. One or more computer storage media with device-executable instructions that, when executed by a computing system, direct the computing system to:
   provide an interactive service to a first user, the interactive service being related to a literary work;
   maintain a recorded position of the first user along a storyline within the interactive service, the storyline within the interactive service corresponding to a storyline within the literary work;
   receive user generated content generated by the first user;
   store the user generated content generated by the first user in a data store, the user generated content generated by the first user being stored with an associated position reference corresponding to the first user's recorded position along the storyline within the interactive service when the user generated content generated by the first user was generated; and
   display user generated content generated by a second user to the first user based at least on the first user's recorded position along the storyline within the interactive service and a position reference associated with the user generated content generated by the second user, the position reference associated with the user generated content generated by the second user representing a position different from a current position of the first user when the user generated content generated by the second user is displayed to the first user.

14. One or more computer storage media according to claim 13, wherein the recorded position of the first user comprises at least one of: a record of the first user's current position along the storyline within the interactive service and a record of the first user's furthest position along the storyline within the interactive service.

15. One or more computer storage media according to claim 13, wherein the interactive service comprises one of an interactive website and a mobile application.

16. One or more computer storage media according to claim 13, wherein the current position of the first user is different from the recorded position of the first user when the user generated content generated by the second user is displayed to the first user.

17. One or more computer storage media according to claim 13, wherein first user's recorded position exceeds the position represented by the position reference associated with the user generated content generated by the second user when the user generated content generated by the second user is displayed to the first user.

18. A system comprising one or more servers, each server comprising a processor and a memory, and wherein the memories of the one or more servers comprise device-executable instructions which when executed cause the system to:
   provide an interactive service to a user, the interactive service being related to a literary work;
   maintain a recorded position of the user along a storyline within the interactive service;
   receive user generated content from the user;
   store the user generated content received in a data store, the user generated content being stored with an associated position reference corresponding to the recorded position of the user along the storyline when the user generated content was generated; and
   display user generated content generated by one or more other users to the user based at least on position references of the displayed user generated content not exceeding the recorded position of the user, at least one position reference associated with the displayed user generated content being different from the recorded position of the user when the user generated content is displayed to the user.

19. A system according to claim 18, wherein the recorded position of the user comprises a record of the user's furthest position along the storyline and wherein the user generated content which is displayed comprises user generated content generated by one or more other users at positions along the storyline which do not exceed the user's recorded furthest position along the storyline.

20. A system according to claim 18, wherein the user is not at the recorded position of the user when the user generated content generated by one or more other users is displayed to the user.

* * * * *

UNITED STATES PATENT AND TRADEMARK OFFICE
CERTIFICATE OF CORRECTION

PATENT NO.       : 8,806,335 B2
APPLICATION NO.  : 13/226130
DATED            : August 12, 2014
INVENTOR(S)      : Tarek Nseir et al.

It is certified that error appears in the above-identified patent and that said Letters Patent is hereby corrected as shown below:

In the Specification

Column 2, line 56 change "only, it" to --only. It--;
Column 5, line 25 change "sating" to --setting--;
Column 5, line 33 change "data" to --date--;
Column 6, lines 23-24 change:
"B-C-C-MMM … M-C-MMM … M- … B … C-MMM … M"
to
--B - C - MMM…M – C - MMM..M- … -B … C - MMM..M--;
Column 10, line 15 change "users" to --user's--; and
Column 10, line 33 change "users" to --user's--.

Signed and Sealed this
Tenth Day of February, 2015

Michelle K. Lee
*Deputy Director of the United States Patent and Trademark Office*